July 7, 1970     G. L. ROGERS     3,519,904

SQUARE WAVE EXCITATION OF FEEDBACK DEVICES

Filed May 28, 1965     2 Sheets-Sheet 1

INVENTOR
GEORGE L. ROGERS

BY *Melvin M. Goldenberg*

ATTORNEY

July 7, 1970  G. L. ROGERS  3,519,904
SQUARE WAVE EXCITATION OF FEEDBACK DEVICES
Filed May 28, 1965  2 Sheets-Sheet 2

INVENTOR
GEORGE L. ROGERS

BY Melvin M. Goldenberg
ATTORNEY

United States Patent Office 3,519,904
Patented July 7, 1970

3,519,904
SQUARE WAVE EXCITATION OF FEEDBACK DEVICES
George L. Rogers, Waynesboro, Va., assignor to General Electric Company, a corporation of New York
Filed May 28, 1965, Ser. No. 459,714
Int. Cl. G05b 19/36, 19/38
U.S. Cl. 318—608          11 Claims

ABSTRACT OF THE DISCLOSURE

In a phase analog servomechanism for controlling the relative position of two objects under the command of command pulses, the resolver is excited with a two phase square wave rather than the conventional two phase sine wave and the output of the resolver is filtered and squared to yield a square wave containing the fundamental frequency for purposes of comparison with command pulses.

---

Figure 1:
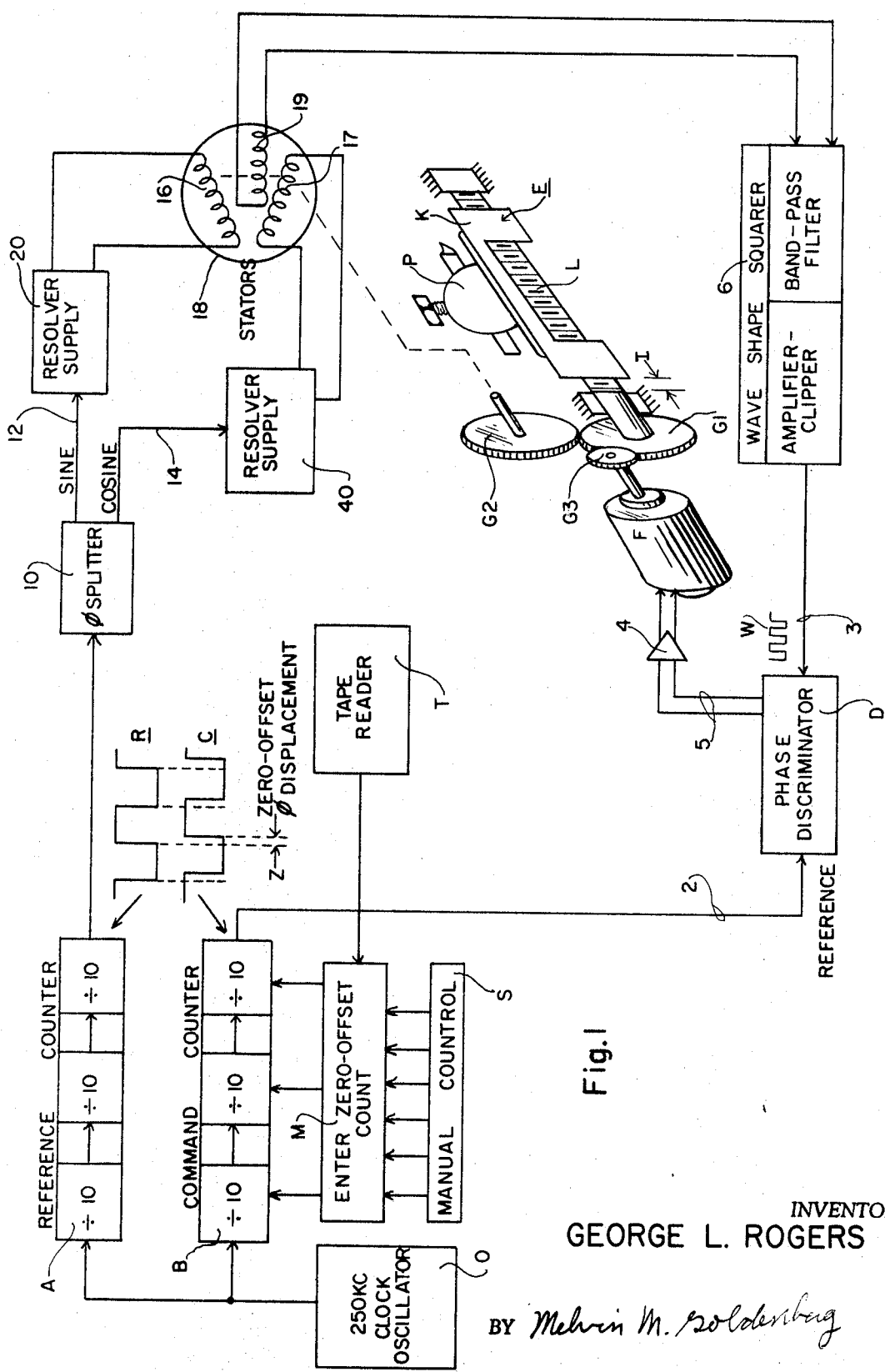

This invention relates to improvements in servo-system circuitry of the type used to excite resolvers in position-control systems, and more particularly relates to improved circuitry for applying square-wave excitation directly from digital solid-state systems operating in switching modes to the windings of the electromagnetic servo-system devices.

In order to provide background for discussion of the present invention, a practical system in which it has utility will be briefly discussed. This system comprises a digital positioning system, of which the Automatic Control system shown in Evans Pat. 3,173,001, issued Mar. 9, 1965 to the assignee of this application, is an example. In this general type of system, a machine element is positioned along one or more axes by servo means driven by digital information taken from a tape or punch card on which it is recorded, and this information in the form of electrical signals is converted into analog shaft positions by suitable servo means coupled to drive said shafts. Solid state command circuitry is employed including plural digital ring counters driven in step-by-step fashion by a common source of pulses. One of the counters is a pulse rate divider which is continuously driven to provide a reference square-wave output, and the digital information read from the tape or punch card is used to zero-offset the count in another ring counter, known as the Command counter, from the count in the Reference ring counter. The degree of offset is a measure of the desired machine element displacement. The ring counters are pulsed by an oscillator at a relatively high rate, for instance 250 kilocycles, and logic systems are employed to convert the count from the above counters into separate 250 cycle-per-second square waves which are mutually displaced in phase from each other by the instantaneous magnitudes of the zero offsets applied to the Command counter relative to the instantaneous count of the Reference counter.

An induction-type resolver according to the present illustrative embodiment has two windings respectively excited in quadrature by components of one of the above-mentioned square waves taken from the Reference counter, and a rotor of the resolver is coupled by appropriate gearing to track with the shaft position of the machine element. The phase of the signal taken from the rotor of the resolver is then compared in a discriminator with the phase of the 250 c.p.s. square wave of the Command counter, and the output of the discriminator is amplified and used to drive the servo which positions the machine element by driving it to bring the phase of the rotor signal into coincidence with the phase of the Command counter signal.

The Reference counter and the Command counter used in the present illustrative system divide the 250 kilocycle signal by a factor of 1000:1. The greater the frequency of the oscillator driving the counters, the finer the increments of machine motion which can be obtained, since in a system of the digital type, the relative phases of the output signals from the counters are determined by the difference in their numerical counts. Therefore, the more counts, the finer the increments of mutual phase displacement.

In the past in digital systems of the above type, the resolvers have been energized by sinusoidal signals whose zero-axis crossings have been compared with respect to a signal of controlled phase to indicate machine element displacement. However, the output of a digital counter is a square wave. It is therefore highly advantageous to provide resolver exciting systems which operate directly from the square waves which are already present in the digital system. Moreover, when the stator windings in a resolver are excited by these square-waves, the resolved component taken from the armature, although no longer a square-wave, contains a fundamental frequency whose phase position is truly related to the phases of the fundamentals contained in the square-wave excitation as modified by the armature position. Therefore, by removing the armature harmonic content, the fundamental which remains has the desired true phase-position information and can easily be shaped to produce a square-wave feedback signal which also preserves this phase information.

Still a further advantage of using square-wave excitation to energize the resolver windings is the ease with which square waves are generated to a greater degree of accuracy both as to phase and as to amplitude. By gating outputs from different locations in a counter chain in a manner well known in the prior art, it is easy to obtain substantially perfect phase displacement control between the two square-waves obtained in this manner. Moreover, the techniques for controlling square-wave amplitudes in solid state circuitry, such as by clipping or by using saturation semi-conductor currents, are highly effective to provide constant amplitude signals.

A further advantage of energizing quadrature resolver winding directly from counter chains is the ease of providing quadrature-related square waves with great accuracy as compared with the poorer accuracy of electronically generating quadrature sine waves.

It is therefore the object of the present invention to provide improved resolver supply circuitry for driving the stationary resolver windings directly with square-wave excitation.

It is another object of the present invention to provide resolver feedback circuitry employing means for restoring to the output signal of the resolver rotor a substantially square waveform for phase-comparison in the discriminator with the Command counter square-wave phase, without shifting the phase of the rotor signal while restoring its square shape.

It is a further object of this invention to provide improvements of the type set forth above in which system accuracy is enhanced despite the simplification of the circuitry resulting from the substitution of square-wave excitation for the resolvers in place of the usual sine wave excitation.

Figure 2:
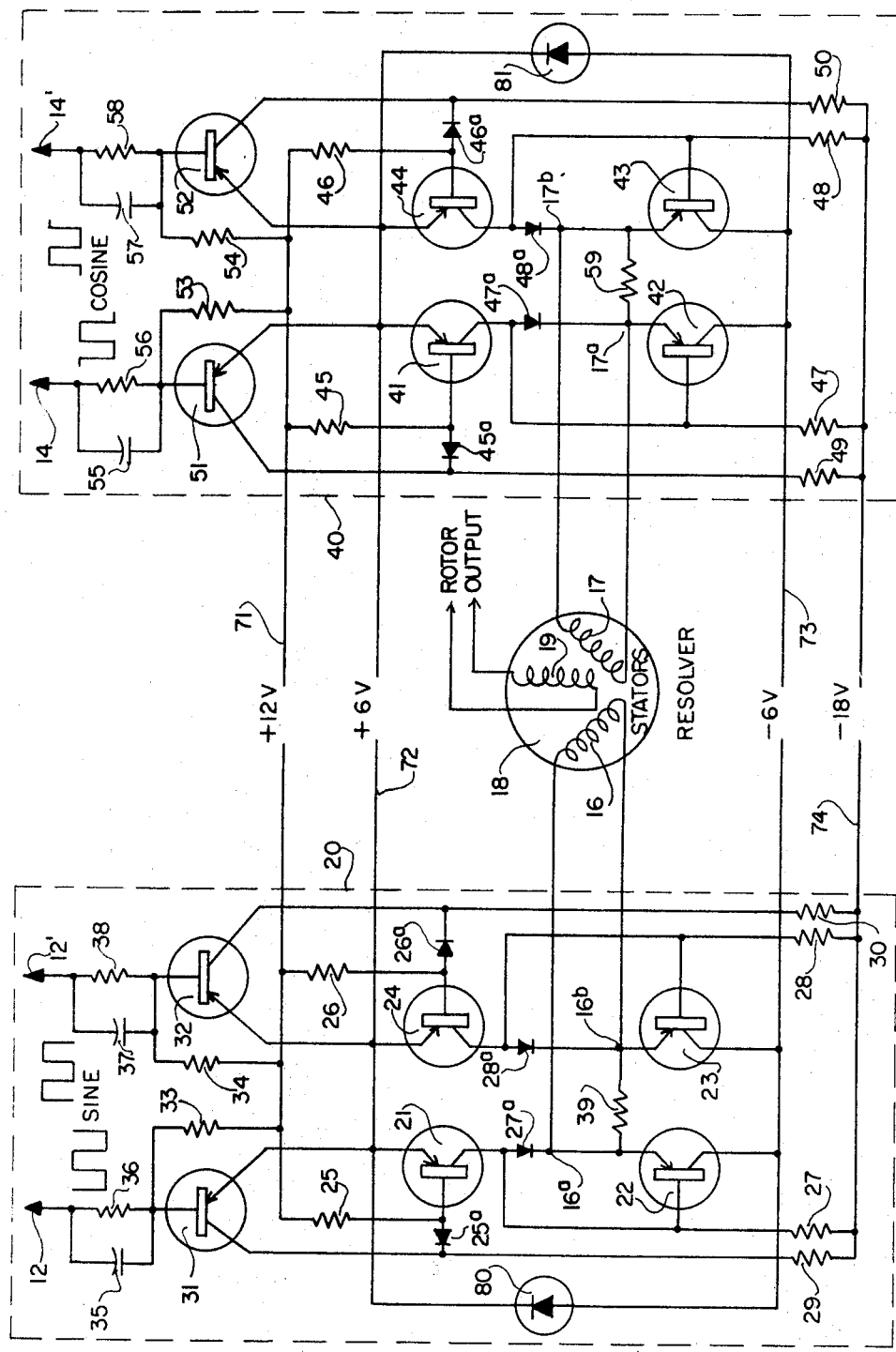

Other objects and advantages of the present invention will become apparent during the following discussion of the drawings, wherein:

FIG. 1 is a schematic diagram showing the present invention incorporated in an exemplary digital machine-motion control system; and FIG. 2 is a schematic diagram showing circuitry for supplying square-wave excitation to the stator windings of a resolver.

Referring now to FIG. 1, the present invention is illustrated as a part of a simplified control system which basically similar to the system shown in Evans Pat. No. 3,173,001, supra. Since this is a digital system, its control is accomplished by using two substantially identical square-waves which are mutually displaced in time, one of the square-waves R comprising a reference signal, and the other square-wave C comprising a motion command signal. The reference wave R corresponds with the signal appearing on wire 27 in FIG. 1 of the Evans patent and extending rightwardly from the box labeled 28. The command wave C on the present drawing corresponds with the signal appearing on wire 19 in FIG. 1 of the Evans patent, and the phase discriminator D of the present invention corresponds with the discriminator in the box labeled 18 of the Evans patent.

The command square-wave C is displaced in phase from the reference wave R through a distance labeled Z and representing the zero-offset of the former with respect to the latter. This offset can be accomplished either by manual control of an operator or by automatic information input to the system, and the degree of phase displacement of the square-wave C with respect to the reference square-wave R is used to operate a servo system to advance a machine element E through a certain increment I from a zero or rest position, the latter position occurring when the command wave C is in phase-coincidence with the reference wave R so that the zero-offset Z is equal to zero.

In order to provide a simple illustration showing the manner in which the two square waves R and C can be generated and mutually displaced, FIG. 1 shows two ring counters including a Reference counter A having outputs gated by means (not shown) to provide the square wave R. The square-wave C comprises the output of a suitable gated Command counter B. Both of these counters are driven by a commond clock oscillator O, and in the working embodiment of the present system, this oscillator provides pulses occurring at a 250 kc. rate. Both the Reference counter A and the Command counter B provide 1000:1 frequency division so that the count in each counter repeats at the rate of 250 c.p.s. If both counters were reset to zero and then pulsed by the same output signal from the oscillator O, the square-waves R and C would always coincide in phase. However, means is provided for initially setting a count other than zero into the Command counter B to displaec the square-wave C resulting from its count with respect to the square-wave R.

For example, if the Command counter B comprises a chain of multivibrators, the means M for entering the count into the Command counter will comprise coupling circuitry connected to each of the multivibrators to control its condition of conductivity and thereby to selectively set a count into the chain of multivibrators to represent a desired zero-offset displacement Z. The entering means M is connected to a manual control S including, for example, manually operated decade switches brought out to front panel dials (not shown), and operative to provide an initial zero-offset count in the Command counter B. Since the principal purpose of the present system is to operate a machine according to a prepared data program, during normal operation the entering means M will be driven by a tape reader T which can read punched tapes or cards, or magnetically recorded information, etc.

The precise means for obtaining the square-waves R and C having the desired mutual phase displacement Z is not part of the present invention, and therefore no detailed illustration thereof is believed necessary, especially since the details of a similar system are described in the above-mentioned Evans patent.

The reference square-wave R is divided by a phase splitter 10 into two quadrature square-wave signals marked sine and cosine and appearing respectively on the wires 12 and 14. These wires also appear at the top of FIG. 2, but since two wires actually supply the sine component they are labeled 12 and 12′, and the other two wires which comprise the cosine components are labeled respectively 14 and 14′ in FIG. 2. These sine and cosine square-waves whose phase position is based upon the reference wave R are applied through novel Resolver Supply circuits 20 and 40 to the stator windings 16 and 17 of a resolver 18, which also has a rotor or armature winding 19 from which an output is obtained whose phase position is a function of the angle which the rotor 19 instantaneously makes with respect to the stators 16 and 17.

The excitation of the stator windings 16 and 17 is provided by said two resolver supply circuits 20 and 40 which are shown in detail in FIG. 2 of the drawings, and described in detail below under the heading RESOLVER SUPPLY CIRCUITRY. For the sake of describing the illustration of FIG. 1, it is sufficient at this point to note the resolver supply circuits 20 and 40 drive the stator windings 16 and 17 respectively with quadrature square-waves which are phase-locked with respect to the phase of the reference square-wave R.

The machine element E to be driven by the system of the present illustration comprises a carriage K supporting a tool post P, for instance in a lathe, and the carriage is moved in and out on a lead screw L supported in suitable bearings. The lead screw in this simple embodiment is connected to a gear G1 which in turn rotates another gear G2 which is connected to turn the rotor 19 of the resolver to sense the position of the carriage K. The gear G1 is driven by a gear G3 on the shaft of a motor F which comprises part of the servo system and which positions the carriage K on the lead screw L.

The phase discriminator D receives the command square-wave signal C on the wire 2, and receives a square-wave W from the resolver 18 on the wire 3, and compares the phase relationship therebetween. Thus, the square-wave W represents a feedback signal indicating the actual position of the gear G2, and therefore of the machine element E. When the Command square-wave C and the feedback square-wave W are precisely in phase, the phase discriminator D will have zero output to the amplifier 4 and the motor F will not run. This condition occurs when the machine element E is positioned exactly according to the Command signal read into the Command counter B, as represented by the zero-offset Z.

However, if the phase of the feedback signal W is displaced in one direction from the phase of the Command signal C arriving at the discriminator D, a signal of one polarity will be applied on the wire 5 and will be amplified by the amplifier 4 to drive the servo-motor F in such a direction as to reduce the phase displacement of the feedback W with respect to the command signal C. On the other hand, if the phase of the feedback signal W is displaced from the phase of the command signal C in the opposite direction, the polarity of the output on wire 5 from the phase discriminator D will be reversed so as to drive the motor F in the opposite direction, thereby again to reduce the phase displacement between the square-waves W and C sufficiently to bring this phase displacement to zero. Thus, it will be seen that by changing the input information read into the Command counter B, to thereby change the amount of zero-offset of the Command square-wave C with respect to the Reference square-wave R, the position of the machine element E can be made to follow a manual or programmed pattern or contour.

The ratio of the gears G1, G2 and G3 should be selected so as to provide the desired amplitude and fineness of control of the carriage movement as the input to the Command counter follows a predetermined program. Actually, in a practical system, there are several differentially driven servo-systems and resolvers performing coarse, medium, and fine machine element positioning functions.

The size of the smallest increment of motion which the present system can perform is also determined by the number of counts which each of the counters A and B must perform during its complete counting cycle. This is the reason why a 250 kc. clock oscillator is used to drive the counters even though a much lower frequency, 250 c.p.s., is used in the resolver and servo-systems. By having each counter A and B count 1000 counts per output wave cycle, the total relative phase displacement which is possible for the square-waves C with respect to the square-wave R is divided into 1000 discrete increments, and the number of increments representing any particular zero-offset Z is selected by determination of the amount by which the Command counter count is offset with respect to the Reference counter count.

Unfortunately, the output of the rotor winding 19 of the resolver 18 is not actually a square-wave for several reasons, including the fact that the frequency response of the windings 16 and 17 when performing a transformer action with respect to the winding 19 is inadequate to transmit a true square-wave, and since the internal reactances and resistances strongly affect the harmonic content of the current flowing in the rotor winding 19. Nevertheless, it is highly desirable to have the feedback wave W comprise a good square-wave so that the discriminator can accurately compare the phase of the feedback wave W instantaneously with the phase of the square-wave C. Therefore, a wave shaper 6 is inserted between the rotor 19 and the phase discriminator D.

This wave shaper 6 comprises a filter designed to pass the fundamental frequency of the output signal of the rotor winding 19, this filter comprising plural stages designed to pass the fundamental frequency but to substantially eliminate all harmonics thereof. This filter can also be provided with internal phase correction so that its net phase shift is zero, or even corrective of some undesirable externally-caused phase error. The filter therefore delivers a sine wave at the fundamental frequency, and having a zero-axis crossing corresponding with a resolved phase position based upon the zero-axis crossing of the square-waves appearing at the stator windings 16 and 17. The sinusoidal fundamental signal passed by the wave filter 6 is then squared by suitable amplification and clipping means also included in the wave shaper 6, so as to provide the square-wave feedback signal W having a corresponding zero-axis crossing. In this way, the distorted harmonic content actually contained in the rotor current 19 is in effect removed and replaced with an artificially generated set of harmonics which not only provide a true square-wave shape comprising the signal W, but also provide such a wave shape having the same zero-axis-crossing phase position as the preserved fundamental component of the current in winding 19.

Although this example refers to a resolver 18, it is to be understood that other types of position transducers will operate satisfactorily according to the teachings of the present invention.

RESOLVER SUPPLY CIRCUITRY

As mentioned in the objects of this invention, the outputs of the Reference counter A and the Command counter B are square-waves formed by solid-state digital counting, and it is therefore convenient to use the square-waves themselves to energize the resolver stator windings without having to convert back to sinusoidal wave shapes. There is also the additional advantage that the resolver supply circuits 20 and 40 can employ transistors operating in their switching modes, which mode of operation not only eliminates problems concerning the linearity of response, but in addition the switching mode of operation provides greater efficiency because the $I^2R$ losses in the transistors are much smaller since their internal resistance values are at almost all times either nearly zero or nearly infinity. FIG. 2 shows the resolver 18 having its stator winding 16 connected as a load to be driven by the supply circuitry 20, and having its stator winding 17 connected as a load to be driven by the supply circuitry 40. The circuitry in the boxes 20 and 40 is identical, and therefore this disclosure will describe the box 20 in detail, and will provide reference characters having similar last digits in the box 40 to describe similar parts having similar functions.

It is assumed that direct current power sources are available providing plus 12 volts on the wire 71, plus 6 volts on the wire 72, minus 6 volts on the wire 73, and minus 18 volts on the wire 74. Basically, the function of the circuits 20 and 40 is to connect the stator windings 16 and 17 first between the plus 6 volt wire 72 and the minus 6 volt wire 73, and then to reverse the connections between these two wires an instant later. In this way, the power-supply current to the winding 16 will comprise a square-wave of reversing polarity, and of 12 volt amplitude. The same thing occurs with respect to the stator winding 17 except that the time of flow of the currents is 90 electrical degrees later.

This periodic reversal of the connections of the winding 16 and of the winding 17 with respect to the power supply lines 72 and 73 is accomplished respectively by solid state electronic valving means which in the present embodiment comprise transistors 21–23, 22–24, and 41–43, 42–44. These transistors are connected between power supply lines 72 and 73 in two adjacent paths each including two transistors connected in series at mid-points 16a, 16b, 17a and 17b. At any particular instant, one set of the diagonally paired transistors such as 21–23 or 22–24 is conductive and the other pair is non-conductive, thereby giving a sort of double-pole, double-throw switching action. The transistors near the top of the figure, including 31 and 32, 51 and 52 are merely driver-amplifiers which accept push-pull square-wave sine and cosine functions respectively from the wires 12, 12' and 14, 14' and control the conductivities of the main switching transistors which excite the resolver 18.

Explaining the circuitry within the box 20, the push-pull driver signals appearing on the wires 12 and 12' are 180 out of phase, and drive the PNP transistors 31 and 32 to saturation or to cut off. The emitters of these transistors are maintained at plus 6 volts, but in the absence of an input signal to the wires 12 and 12', the resistances 33 and 34 maintain the bases of the transistors 31 and 32 more positive than their emitters, thereby keeping these transistors cut-off in the absence of a signal. The resistors 36 and 37 serve as voltage dividers when considered together with resistors 33 and 34, and the capacitors 35 and 37 by-pass resistors 36 and 38 to improve pulse rise times for the input square-waves.

The Zener diodes 80 and 81 are included to help regulate the voltage difference between the wires 72 and 73 to precisely 12 volts by drawing current against the internal resistance of the power supply (not shown). If the power supply itself is regulated, then the Zener diodes 80 and 81 can be eliminated. The transistors 21, 22, 23, 24, and 41, 42, 43, and 44 are P.N.P. type so that they are cut off whenever their bases are more positive than their emitters.

The upper switching transistors 21, 24, 41 and 44 have their emitters maintained at a constant plus 6 volts, and their bases are returned through resistors 25, 26, 45 and 46 to the plus 12 volt wire 71, thereby tending to cut them off. However, the diodes 25a, 26a, 45a, and 46a connect through the resistors 29, 30, 49, and 50 to the minus 18 volt supply line 74, and these resistors are of lower ohmic value than the resistors 25, 26, 45, or 46. Therefore, in the absence of the transistors 31, 32, 51, and 52, the transistors 21, 24, 41 and 44 would remain conductive. At the beginning of the wave-shape cycles shown next to the wires 12—12', it can be seen that the base of the transistor 31 is momentarily driven negative and the base of the transistor 32 is driven more positive so that the former is rendered conductive to the point of saturation, and the latter remains cut off. Since in the absence of the transistor 32, the transistor 24 is normally maintained conductive by the resistor 30, the transistor 24 can now be considered conductive, because the cut off transistor 32 has no effect upon its bias.

Conversely, however, the transistor 31 is strongly conductive and therefore has a very low internal resistance so that the negative voltage normally appearing at the upper end of the resistance 29 is essentially eliminated since this point in the circuit is connected to the plus 6 volt power line through transistor 31. Therefore, the positive bias applied through the resistor 25 directly to the base of the transistor 21 will dominate, thereby cutting off the transistor 21.

As discussed immediately above, the transistor 21 is cut off when the transistor 24 is saturated for the first cycle of the wave shapes shown next to the wires 12–12′. Since there is substantially no current flowing through the transistors 21, there will be no voltage drop appearing across the diode 27a, and therefore the resistance 27 can apply a negative forward bias to the base of the transistor 22 from the minus 18 volt power supply line 74.

Conversely, since saturation current is flowing through the transistor 24 to the lower end of the stator winding 16, through this winding, and from the upper end of winding 16 through the transistor 22 to power supply line 73, this current will provide a voltage drop across the diode 28a, and the upper end of the diode 28a which is connected to the base of the transistor 23 will be more positive than the lower end of the diode 28a which is connected to the emitter of transistor 23. As a result, transistor 23 will be cut off.

Thus, at the instant of time presently under consideration, transistors 22 and 24 are conductive and transistors 21 and 23 are cut off, and they will remain so until the wave forms applied at wires 12 and 12′ reverse so that wire 12 goes positive and wire 12′ goes negative.

When this occurs, transistor 31 will cut off and transistor 32 will be saturated, and therefore transistor 21 will be rendered conductive and transistor 24 will be cut off. There will be no voltage drop across diode 28a with the result that resistance 28 will be able to forward-bias transistor 23. Conversely, a voltage drop will appear across diode 27a as a result of the current flowing down through that diode, through winding 16, and through the emitter and collector of transistor 23 to the wire 73. The resulting voltage drop across diode 27a will render the base of transistor 22 more positive than its emitter, thereby cutting off transistor 22. Hence transistors 21 and 23 will conduct and transistors 22 and 24 will be cut off.

It should thus be apparent that if the waveforms on wires 12 and 12′ alternate between positive and negative instantaneous values, the current through the stator winding 16 will reverse its direction of flow under the control of this input to wires 12 and 12′.

Since the conductive transistors 21–23 or 22–24 are saturated, their internal resistance is extremely low, and therefore there is only a slight voltage drop in the nominal 12 volts applied to the stator winding 16.

The structure and performance of the circuitry shown in box 40 is the same as that shown in the box 20, except that the former drives the stator winding 17 according to the cosine function of the square-wave applied in push-pull to the wires 14–14′, and therefore the phase of the square-wave current passing through the stator winding 17 is displaced from the similar square-wave current passing through the stator winding 16 by 90 electrical degrees.

The following table provides satisfactory circuit component values for use in the circuitry shown in FIG. 2:

Transistors 21, 22, 23, 24, 31, 32, 41, 42, 43, 44, 51 and 52—2N1172
Resistors 25, 26, 45, and 46—3300 ohms
Diodes 25a, 26a, 27a, 28a, 47a, and 48a—1N1487
Resistors 27, 28, 47, and 48—680 ohms
Resistors 29, 30, 49, and 50—1000 ohms
Resistors 39 and 59—100 ohms
Zener diodes 80 and 81 (12 volts, 10 watt)—1N2976
Resolver 18—Kearfott Mod. 3R982–55

Selected after determining the potentials and circuit impedances to which the wires 12, 12′, 14, 14′ are connected:
Resistors 36, 38, 56, and 58
Resistors 33, 34, 53, and 54
Capacitors 35 and 37

Although in accordance with the provisions of the patent statutes this invention is described as embodied in concrete form and the principle thereof has been explained in terms of the best method known at present for applying that principle, it will be understood that the apparatus shown and described is merely illustrative, and that the invention is not limited thereto since alterations and modifications will readily suggest themselves to those skilled in the art without departing from the true spirit of this invention or from the scope of the annexed claims:

What I claim as new and on which I desire to secure Letters Patent of the United States is:

1. A servo system for positioning a mechanical element along a coordinate from a starting point in response to the amount of relative displacement between the phase of a controlled square-waveform and the phase of a reference square-waveform having a given fundamental frequency, comprising:
   (a) motor means connected for moving said element along said coordinate,
   (b) resolver means having a position-sensing armature winding coupled to and movable with said element, and having stator windings angularly displaced by a fixed amount;
   (c) exciter means coupled to separately excite the stator windings with square-waves;
   (d) exciter-control means connected to receive said reference waveform and having separate square-wave outputs angularly displaced in phase by said amount, and coupled to said exciter means to control the latter;
   (e) wave shaper means responsive to the stator excited square waves induced in said armature winding for squaring the induced waves into a square feedback waveform having as its fundamental frequency said given fundamental frequency; and
   (f) phase discriminator means connected to receive said controlled waveform and said feedback waveform, and operative to deliver an output signal to the motor means to drive it in a direction to bring the latter waveforms into phase coincidence.

2. In a system as set forth in claim 1, a source of power including direct-current power lines; and said exciter means each comprising:
   (a) valve means coupled across said power lines to form two paths, each including first and second series-connected valve means, a stator winding being connected to the mid-points between the valve means in the paths;
   (b) bias means connected to the valve means in each path and operative to maintain the condition of conductivity of the second valve means in the path opposite to that of the first valve means in that path; and
   (c) said exciter control means having its outputs coupled respectively to the first valve means in each path to drive them alternately to saturation and to cut-off.

3. In a system as set forth in claim 2, said valve means comprising transistors having emitter-collector circuits connected in series between the power lines in each path and each having a base electrode; said bias means including means connected to the base electrodes for forward biasing the transistors, impedance means connected in each path in series with the first transistor and developing a potential when the transistor conducts, means connected between the impedance means and the second transistor in the same path for biasing the conductivity of the latter opposite to the conductivity of the first transistor; and the base electrodes of the first transistors being connected to the control means.

4. In a system as set forth in claim 3, said control means comprising control valves respectively connected to receive said square-waves, and respectively connected to the bias means for the base electrodes of the first transistors to interrupt the forward bias on an electrode whenever the corresponding control valve is driven by the square-wave to one condition of conductivity and to restore the forward bias on that electrode when the corresponding control valve is driven to the other condition of conductivity by the square-wave.

5. In a system as set forth in claim 1, said wave shaper means comprising a frequency filter tuned to pass the fundamental frequency and suppress the harmonics of the square-wave excitation induced in said armature winding; and amplifier-clipper means coupled to receive said fundamental frequency and shape it into said square feedback waveform.

6. In a system for positioning a machine-element according to programmed digital data, and having two digital counters stepped by a common generator and delivering similar square-wave outputs at predetermined counts, and one counter being controlled by said data to offset the phase of its count with reference to the other non-controlled counter:
   (a) servo drive means coupled to said element to displace the latter from a start position by an amount controlled by the degree of said offset;
   (b) resolver means having quadrature stator windings and having an armature winding coupled to sense the physical displacement of said element;
   (c) means coupled to receive the square-wave from the non-controlled counter to provide quadrature square-wave outputs having a given fundamental frequency,
   (d) means for applying each of said quadrature square-wave outputs to a respective stator winding to produce an output wave in said armature winding having said given fundamental frequency whose phase varies as a function of the armature winding position with respect to said stator windings,
   (e) wave shaper means coupled to receive said output wave from the armature winding and operative to deliver a square feedback waveform; and
   (f) means connected to receive said feedback waveform and to receive said controlled counter output, and operative to compare the phases thereof and to deliver a control signal to the servo means to drive the element in a direction to reduce the difference between the compared phases.

7. In a system as set forth in claim 6, said wave shaper means comprising a frequency filter tuned to pass the fundamental frequency and suppress the harmonics of the square-wave excitation induced in said armature windings; and amplifier-clipper means coupled to receive said fundamental frequency and shape it into said square feedback waveform.

8. In a servo system for cooperating with a digital system having two square-wave signals whose mutual phase displacement relates to a desired mechanical element position, and said servo system having a drive motor and having a position transducer having exciter windings and having an output winding whose phase with respect to the exciter windings depends upon said element position,
   (a) means for driving said exciter windings connected to receive one of said square-waves and coupled to deliver separate square-waves mutually displaced in phase to said exciter windings;
   (b) filter means coupled to said output winding to receive a signal modified in phase by the transducer position and to filter the harmonics from said signal and pass its fundamental;
   (c) means for returning said fundamental to a square waveform; and
   (d) discriminator means connected to receive the other of said square-waves, and to receive said waveform, and operative to detect their relative phase displacement and to deliver to the motor a signal to drive it in a direction to bring the latter waveforms into phase coincidence.

9. An arrangement for controlling the position of an object with a servomechanism in response to a train of commanded position pulses available from a source comprising a source of clock pulses, a first converter, means to couple said first converter to said clock source to provide first square waves of a given fundamental frequency, a second converter, means to couple said second converter to said clock source and said commanded position pulse source to provide second square waves of said given fundamental frequency whose phase with respect to said first square waves varies as a function of the number of pulses in said train, resultant wave producing means, means for applying square waves from one of said converters to said resultant wave producing means, said resultant wave producing means responsive to the position of said object and said applied square waves from one of said converters for producing resultant waves having said given fundamental frequency and whose phase with respect to the fundamental frequency of said one of said converters varies as a function of the actual position of said object with respect to the commanded position as established by said commanded position pulse source, said servomechanism responsive to the phase difference between said resultant waves and the square waves from the other of said converters to position said object.

10. An arrangement for controlling the position of an object with a servomechanism in response to a train of commanded position pulses available from a source comprising a source of clock pulses, a first converter, means to couple said first converter to said clock source to provide first square waves of a given fundamental frequency, a second converter, means to couple said second converter to said clock source and said commanded position pulse source to provide second square waves of said given fundamental frequency, whose phase with respect to said first square waves varies as a function of the number of pulses in said train, a resolver having a stator and a rotor, means for applying square waves from one of said converters to said stator, means including said rotor responsive to the position of said object and the waves induced in said rotor from said stator for producing resultant waves of said given fundamental frequency, said servomechanism responsive to the phase difference between said resultant waves and the square waves from the other of said converters to position said object.

11. An arrangement for controlling the position of an object with a servomechanism in response to a train of commanded position pulses available from a source comprising a source of clock pulses, a first converter, means to couple said first converter to said clock source to provide first square waves of a given fundamental frequency, a second converter, means to couple said second converter to said clock source and said commanded position pulse source to provide second square waves of said given fundamental frequency whose phase with respect to said first square waves varies as a function of the number of pulses in said train, a resolver having a pair of stators and a rotor, means for converting one of said square waves into a pair of square waves having a 90° relative phase displacement, means to apply each of said pair of square waves to a respective stator, said rotor mechanically coupled to said object, said rotor responsive to the position of said object and the waves coupled to said rotor from said stator for producing resultant waves having said given fundamental frequency and whose phase is a function of the rotor position with respect to the stators, means for selecting said given fundamental frequency waves from said resultant waves, said servomechanism responsive to the phase difference between said selected fundamental frequency waves and the square waves from the other of said converters to position said object.

References Cited

UNITED STATES PATENTS 2,983,872  5/1961  Williamson et al. -- 318—28 XR
3,175,138  3/1965  Kilroy et al. --------- 318—28
3,359,499  12/1967  McDonough et al. ----- 318—18
3,374,359  3/1968  Anderson ----------- 318—28

BENJAMIN DOBECK, Primary Examiner

U.S. Cl. X.R.

318—24, 28